G. WEISLOW

April 12, 1932. SELF LOCKING ENVELOPE DEVICE Re. 18,422

Original Filed Dec. 21, 1928

Inventor:
George Weislow.
Charles Y. Bell
Atty.

By:

Reissued Apr. 12, 1932

Re. 18,422

UNITED STATES PATENT OFFICE

GEORGE WEISLOW, OF CHICAGO, ILLINOIS, ASSIGNOR TO SELF LOCKING FOLDER CO., OF CHICAGO, ILLINOIS, A CORPORATION OF ILLINOIS

SELF LOCKING ENVELOPE DEVICE

Original No. 1,760,460, dated May 27, 1930, Serial No. 327,548, filed December 21, 1928. Application for reissue filed November 27, 1931. Serial No. 577,720.

This invention relates to a self-locking device for use on mailing circulars, envelopes, folders, cartons, containers and the like, and more particularly to a locking device having a doubled flap for insertion in a slit to securely lock the container in closed position without having to use other fastening means such as stickers, clips, and the like.

An object of the invention is to provide a mailing circular which is folded in such manner as to provide space for the address and postage and which is locked in folded condition by a doubled flap inserted in a slit which flap cannot be displaced by the rough usage incidental to transportation by mail.

Another object of the invention is to provide an envelope or container which may be locked by means of a doubled flap adapted to be inserted in a slit in the container, said flap being removable by pulling the same out of the slit.

A further object of the invention is to provide a container or envelope which may be locked by a doubled flap inserted in a slit in the container and which flap is retained in locking position solely by reason of its construction thus eliminating the use of stickers, clips, and other fastening means.

A still further object of the invention is to provide a container which may be locked by a flap which is formed from a free end portion of the container by doubling the material on itself and inserting the folded end foremost in the slit leaving the free end exposed as a tab for withdrawing the flap.

A further object of the invention is to provide a container or the like having a doubled flap for insertion in a slit for locking the container by a spreading or wedging action.

The above, other, and further objects of the invention will be apparent from the following description, accompanying drawings, and appended claims.

According to the invention the blank comprising the container is provided with a portion having a free end which end is doubled on itself providing a folded edge with the free end then serving as a tab, the folded portion constitutes a flap which is inserted in a slit and retained securely locked in the slit by reason of the folded condition of the flap necessitating no additional means such as stickers and the like for securing the container in closed condition.

One form of the invention is illustrated in the accompanying drawings and the views thereof are as follows.

Figure 1:
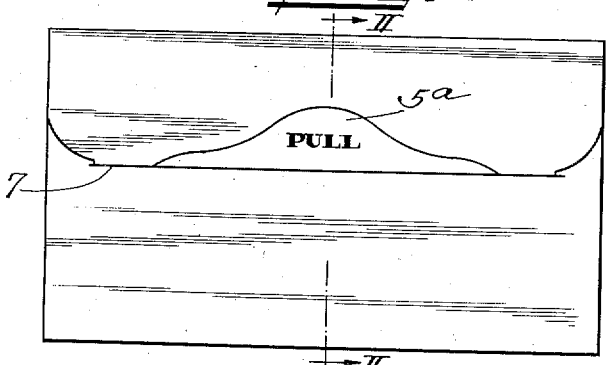
Figure 1 is an elevational view of a mailing circular embodying the invention.

Mailing circulars, envelopes and the like are made in many and various styles including single sheets folded from one end towards the other and also with the side panels which are folded over one another and then the whole folded into a compact package such as that shown in Figure 1.

The blank chosen to illustrate the present invention is somewhat diagrammatic in form and it is to be understood that the invention is not limited to a circular made in the style and arrangement as shown but that the invention applies to any type of mailing circular, folder, envelope, container or the like.

The illustrated form of the invention includes a blank A which may be of any desired length and width which blank A is scored or otherwise treated to provide transverse folds 1, 2, and 3 so that the sections intermediate these several folds may be folded in a manner well understood.

Attached to and forming a part of the circular A is a free end portion B which is shown as being narrower than the body portion A. The portion B is scored at 4 so that the parts 5 and 6 of the portion B may be folded along the score 4 so as to provide an expansible doubled flap indicated at C in Figure 4 with the portion 5 providing a free end $5^a$ for prehension whereby the flap C may be inserted in a slit 7 when the circular is folded or withdrawn therefrom when unfolding the circular.

The slit 7 is formed in any suitable part of the body A in such position that when the circular is folded the flap C will readily enter the slit. The portion B may be provided with undercut corners or notches 8 and 9 for locking the flap C in the slit 7. However, these corners may be square or slightly curved as desired.

The side of the folded circular opposite to that shown in Figure 1 is useful for receiving the address and postage for transmittal of the circular by mail.

Figure 2:
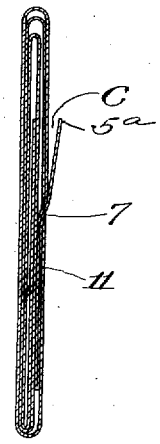
Figure 2 is a vertical central section through the circular of Figure 1 taken on line II—II of said figure.
Figure 4:
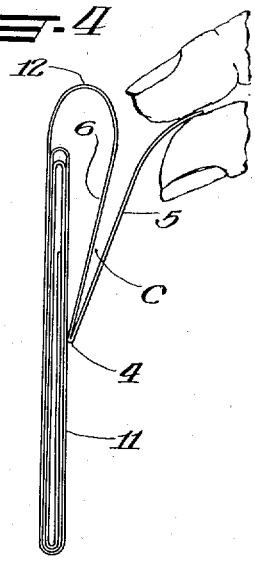
Figure 4 is a sectional view similar to Figure 2 showing the flap as the same appears when withdrawn from the slit or about to be inserted in the slit.

The circular illustrated may be folded from the end portion of the body A into what is shown in the drawings as six plies or sections thus bringing the section containing the slit 7 in the position shown in the drawings. The flap C is then inserted in the slit 7 by grasping the end 5[a] of the portion 5 and pushing the fold 4 into the slit 7. The portions 5 and 6 of the part B constitutes a wedge so that when the same are inserted in the slot 7 a spreading or wedging action takes place between the flap B and the portion 11 of the body A immediately below the slit 7. The arrangement of the flap C is such that when the same is inserted in the slit 7 a crimping action takes place between the flap B and the portion 11 of the body A at the slit 7 as is shown in Figure 2 of the drawings. This construction of the several parts securely locks the flap C in the slit without the requirement of further fasteners such as stickers, clips, and the like. The depth of the portions 5 and 6 of the flap B is such that when the flap is inserted in the slit 7 it will extend a considerable distance below said slit within the portion 11 of the circular body. This as well as the crimping action between the portion 11 and the flap B securely locks the flap in the circular. The free end of the portion 5 may be grasped as is indicated in Figure 4 for inserting the fold 4 in the slit 7 or for withdrawing the flap from the circular.

A circular constructed in accordance with this invention may be readily sent through the mails and will not come apart or unfold from the rough usage incidental to mail transportation. The circular made in accordance with this invention provides a secure lock between the flap and the body of the circular whereby the flap may be readily inserted and withdrawn when desired.

Figure 3:
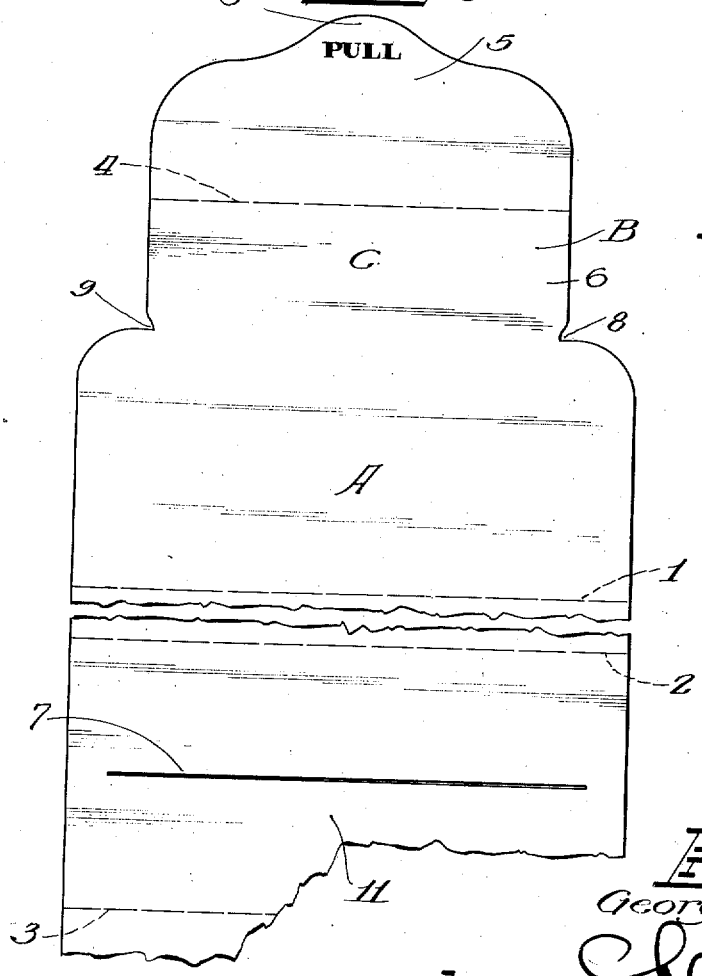
Figure 3 is a fragmental view of the circular of Figure 1 extended with certain parts broken.

A circular may be made from a blank having side portions folded along the lateral edges of the body A as the same appears in Figure 3 and may be made of any size or arrangement or number of folds.

The gist of the invention resides in the provision of a free portion B folded to provide the folded edge 4 for insertion in a slit in the body of the device and thus providing a free end for inserting and withdrawing the flap with the flap constituting a wedging or spreading action, together with a crimping effect between the flap and slit.

The connection between the free portion B and the body A of the device is not folded so that when the flap C is bent over and inserted in the slit 7 there will be a spring action in the curve 12 which tends to force the flap C downwardly into the slit 7 and thus aid in holding the flap closed.

The circular, envelope or container when folded is compact and convenient for mailing and when extended is opened for the usual purposes.

The invention has been described herein more or less precisely, yet it is to be understood that changes may be made in the arrangement and proportion of parts and that equivalents may be substituted without departing from the spirit and scope of the invention.

The invention is claimed as follows:

1. A mailing circular including a body foldable into compact form, a free end portion integral with said body, said body having a slit therein, said end portion being folded transversely thereof intermediate its length, said folded free end constituting a flap insertable in said slit when said body is folded.

2. A mailing circular including a body foldable into compact form, a free end portion integral with said body, said body having a slit therein, said end portion being transversely folded intermediate its length, said folded free end constituting a flap insertable in said slit when said body is folded, and the free end of said flap constituting prehensible means for inserting and withdrawing the flap.

3. A mailing circular including a body foldable into compact form, a free end portion integral with said body, said body having a slit therein, said end portion being folded transversely intermediate its length, said folded free end constituting a flap insertable in said slit when said body is folded, said flap being crimped when in said slit for locking the same in folded condition.

4. A mailing circular comprising a blank which may be folded into compact form for mailing, said blank having a free end portion, said blank having a slit therein, said free end portion being doubled on a transverse line and insertable in said slit when said blank is folded for locking the same in folded condition.

5. A mailing circular comprising a blank which may be folded into compact form for mailing, said blank having a slit therein, said blank having also a free end portion which may be doubled transversely intermediate its length and inserted along the doubled edge in said slit when said blank is folded for locking the same in folded condition, said folded end constituting a flap which is retained in said slit by reason of the folded nature of the flap and the tendency of the folded parts to spring apart.

6. A mailing circular comprising a blank which may be folded into compact form for mailing, said blank having a free end portion, said blank having a slit therein, said free end portion being doubled on a transverse line and constituting a flap insertable in said slit when said blank is folded for locking the circular in folded condition, the connection between the blank and the free end portion being unscored for providing a spring-like action for the retention of the flap in said slit.

7. An envelope like device comprising a body having a slit therein, a free end portion connected with said body, said end portion being transversely folded back upon itself to provide an expansible flap insertable in said slit to close the body.

8. An envelope like device comprising a body having an opening therein, an extension on said body transversely folded upon itself to form an expansible flap for insertion in said opening to close the device.

9. An envelope like device comprising a body having a slit therein, a closure member on said body and folded transversely to form a wedge flap insertable in said slit to close the container, said closure member formed with notches for co-action with the ends of said slit to hold the flap locked in position.

10. An envelope like device comprising a body having a slit therein, a notched extension on said body transversely folded upon itself to form an expansible flap for insertion in said slit with the notches of the extension co-acting with the slit to hold the flap locked in closed position.

11. In a device of the class described such as a circular, envelope, and the like, a body member having a slit therein and a flap associated with said body for insertion in said slit and composed of a plurality of layers transversely folded upon themselves and arranged to be extended into a single layer upon removal of said flap from said slit.

12. In a device of the class described such as a circular, envelope, and the like, a body member having a slit therein and a flap associated with said body for insertion in said slit and composed of a plurality of layers transversely folded upon themselves and arranged to be extended into a single layer upon removal of said flap from said slit, said flap having its sides notched to form shoulders for engagement with said body at the ends of said slit to limit inward movement of said flap in said slit.

13. An envelope like device comprising a body, and an extension on the body transversely folded upon itself to form an expansible flap, said body provided with means freely and slidably receiving the folded extension to close the body.

In testimony whereof I have hereunto subscribed my name at Chicago, county of Cook, State of Illinois.

GEORGE WEISLOW.